United States Patent [19]

Chen et al.

[11] Patent Number: 5,325,253
[45] Date of Patent: Jun. 28, 1994

[54] STABILIZATION OF MAGNETORESISTIVE TRANSDUCER USING CANTED EXCHANGE BIAS

[75] Inventors: Mao-Min Chen; Timothy J. Gallagher; Wang: Po-Kang, all of San Jose, Calif.

[73] Assignee: International Business Machines Corporation, Armonk, N.Y.

[21] Appl. No.: 18,612

[22] Filed: Feb. 17, 1993

[51] Int. Cl.⁵ .............................................. G11B 5/39
[52] U.S. Cl. .................................................. 360/113
[58] Field of Search ............... 360/113; 427/548, 557, 427/559; 29/603

[56] References Cited

U.S. PATENT DOCUMENTS

| | | | |
|---|---|---|---|
| 4,663,685 | 5/1987 | Tsang | 360/113 |
| 4,785,366 | 11/1988 | Kroumbi et al. | 360/113 |

Primary Examiner—A. J. Heinz
Attorney, Agent, or Firm—Henry E. Otto, Jr.

[57] ABSTRACT

A magnetoresistive (MR) read transducer and method of fabricating same. A soft magnetic layer and an MR layer extend over a central active region and passive end regions of the transducer. A nonmagnetic spacer layer separates the soft magnetic film layer and MR layer and extends over the central active region and at least part of both passive end regions. An antiferromagnetic layer directly contacts the MR layer only in the end regions and produces an exchange bias field between the antiferromagnetic layer and the MR layer that is oriented at a preselected acute angle to the longitudinal direction of the transducer. This results in the MR layer being oriented at the preselected acute angle and the soft magnetic film layer in the passive end regions being transversely oriented by magnetostatic coupling to the MR layer. To fabricate the transducer, the antiferromagnetic layer is annealed in an external field above the Neel temperature to produce the canted exchange bias field. As a result of the canting, the magnetic moments of the central active region and the passive end regions are matched during a read operation.

7 Claims, 2 Drawing Sheets

STABILIZATION OF MAGNETORESISTIVE TRANSDUCER USING CANTED EXCHANGE BIAS

FIELD OF THE INVENTION

This invention relates to magnetoresistive (MR) read transducers for use in thin film magnetic heads for reading data from magnetic storage devices, and relates more particularly to an MR transducer and a method of fabricating same in which an exchange bias field is canted at a preselected angle during fabrication for causing the magnetic moment between active and passive regions of the transducer to be matched during a read operation.

BACKGROUND OF THE INVENTION

An MR read transducer requires an active region and passive regions. The active region comprises suitable means for transversely biasing the transducer, and each passive region generally includes suitable means for longitudinally biasing the transducer.

The longitudinal bias is necessary to free the MR transducer from Barkhausen noise. This longitudinal bias can be provided by a "patterned exchange" which uses either an antiferromagnetic or a hard magnetic biasing layer that is exchange-coupled to the passive regions to induce a single magnetic domain state in the active region.

Commonly assigned U.S. Pat. No. 4,663,685 describes a simple implementation of patterned exchange using a continuous spacer layer. This patent discloses an MR transducer comprising a continuous spacer layer separating a continuous MR layer and a continuous soft magnetic layer. Anti-ferromagnetic bias material deposited only in the passive end regions produces a bias field which is directed longitudinally of the transducer. Because the magnetic orientation of the soft magnetic layer in the passive regions is not controlled by the exchange coupling, multiple magnetic states are possible. Tests of head disk assemblies (HDAs) show occasional problems because the magnetic fields generated by the passive regions influence the MR response of the transducer.

Commonly assigned U.S. Pat. No. 4,785,366 shows a patterned spacer layer configuration that was developed to provide direct control, by exchange coupling, of the entire passive regions to produce optimium transducer performance. This patent discloses an MR transducer comprising a patterned spacer layer between a continuous soft magnetic layer and a continuous MR layer, and an exchange bias layer of antiferromagnetic material overlaying the soft magnetic layer. The spacer layer extends beyond the active region into the adjacent ends of the passive end regions to provide alignment tolerance during fabrication.

It has been found during manufacture and testing at the HDA level, however, that some patterned spacer configured transducers have been unstable as denoted by waveform distortions. It was also found that these transducers often exhibited considerable variability in output characteristics even if processed from the same wafer row. Both the instabilities and some of the performance variations of the patterned spacer configuration were found to originate within the regions of unconstrained moment in the soft magnetic film that correspond to the regions in which the spacer layer extends beyond the central active region into the two passive end regions. No correlation with process variations were found to account for these random occurrences of instability.

Since no process solution appears possible, there is a need for a solution that can be achieved by a configuration change that will increase the tolerable range of normal material and manufacturing process variations in a manner which does not complicate the fabrication process and maintains high yields.

No prior art known to applicants discloses or suggests an MR transducer of either the continuous spacer or the patterned spacer configuration having a canted exchange field in the passive end regions to match the magnetic moment between the central active region and the passive end regions during reading; i.e., during operation when the current is on. In prior arrangements, the orientation of the passive region remained the same whether the current was on or off and the moment was matched when the current was off, rather than when the current was on.

SUMMARY OF THE INVENTION

A magnetoresistive (MR) read transducer and method of fabricating same is described. A soft magnetic film layer and an MR layer extend over a central active region and passive end regions of the transducer. A nonmagnetic spacer layer separates the soft magnetic film layer and MR layer and extends over the central active region and at least part of both passive end regions.

An antiferromagnetic layer directly contacts the MR layer only in the end regions and produces an exchange bias field between the antiferromagnetic layer and the MR layer that is oriented at a preselected acute angle (preferably between about 40–45 degrees) to the longitudinal direction of the transducer. This results in the MR layer being oriented at the preselected acute angle and the soft magnetic film layer in the passive end regions being transversely oriented by magnetostatic coupling to the MR layer. The spacer layer may extend the full length of both end regions to constitute a continuous space layer or may be a patterned spacer layer that overlies only a part of each end region closely adjacent to the central active region.

To fabricate the transducer, the antiferromagnetic layer is annealed in an external field above the Neel temperature to produce the canted exchange bias field. As a result of the canting, the magnetic moments of the central active region and the passive end regions are matched during a read operation. The antiferromagnetic layer may comprise a MnFe/NiFe multilayer structure, in which case the annealing temperature is of the order of about 160 to 180 degrees C.

DESCRIPTION OF PREFERRED EMBODIMENTS

Figure 1:
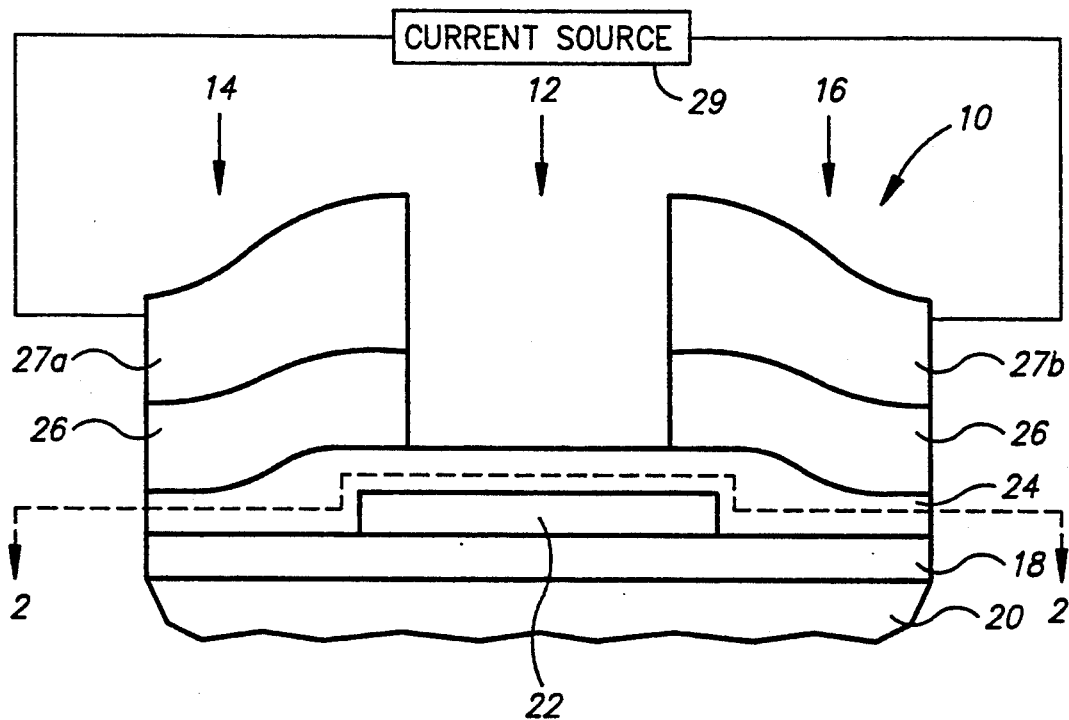
FIG. 1 is an end view of an MR transducer with a patterned spacer layer and to which one embodiment of the invention is applied.

As illustrated in FIG. 1, a magnetoresistive (MR) transducer 10 according to this embodiment of the invention comprises a central active region 12 separating two passive end regions 14, 16. A thin continuous soft film magnetic layer 18 is deposited on a substrate 20. Then a spacer layer 22 of nonmagnetic material is patterned on soft magnetic film layer 18 to extend over the central region 12 and for a short distance into end regions 14, 16. A thin continuous MR film layer 24 contacts the spacer layer 18 and that part of the soft film layer beyond the ends of the spacer layer. An antiferromagnetic layer 26 is patterned so that it contacts the MR layer 24 only in the end regions 14, 16 to provide a bias field produced by exchange coupling between the antiferromagnetic layer and the MR layer only in these end regions to provide domain suppression. Conductor leads 27a, 27b contact the antiferromagnetic layer 26 only in the end regions 14, 16, respectively. A bias current source 29 connected between conductor leads 27a, 27b provides a bias current in the central region 12 to generate a transverse bias for producing a linear response mode of the transducer.

Figure 2:
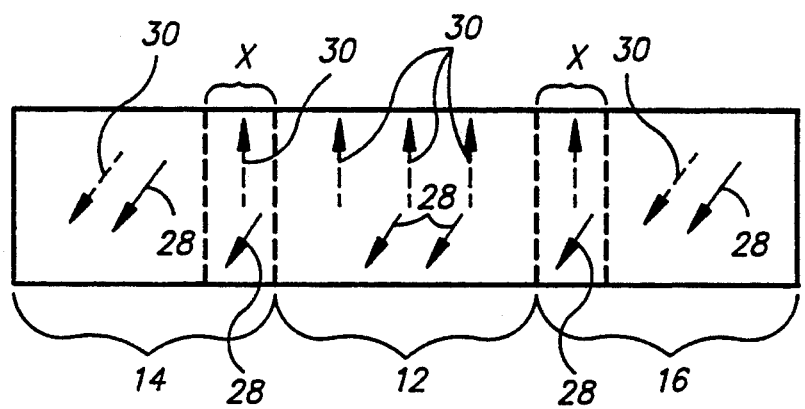
FIG. 2 is a sectional view taken along the line 2—2 of FIG. 1 showing the orientation of the magnetic moments in an MR layer and a soft film magnetic layer.

As thus far described, MR transducer 10 is substantially identical with that disclosed the above-cited U.S. Pat. No. 4,785,366. However, according to the invention, instead of providing a longitudinal bias in end regions 14, 16, as previously taught, the direction of the exchange bias is canted after the transducer is fabricated in order to match the magnetic moments 28 of the central region and end regions during a read operation. This is done by annealing in an external field above the Neel temperature of antiferromagnetic layer 26; e.g., 160 to 180 degrees C. for MnFe/NiFe coupled films. This cants the moment in the MR layer 24 in the direction of arrows 28, as shown in FIG. 2; and the unconstrained soft magnetic film both in and adjacent to the central active region 12 is transversely oriented through magnetostatic coupling in the direction of arrows 30 by the moment of the MR layer. Since the longitudinal moment of MR layer 24 is matched across the boundaries between the active and passive regions there are no free magnetic poles at track edges to demagnetize soft magnetic layer 18. It has been shown by actual test that there is no instability even though there are two domain walls pinned at the edges of the spacer layer 22. In addition to stabilizing operation of the transducer, it was found that the amplitude of the signal sensed by the transducer was increased significantly. This is believed to result from the elimination of charges at track edges that tend to stiffen the MR film layer and reduce signal response. The magnetic state of the regions X (FIG. 2) is controlled by rotating the orientation of the antiferromagnetic exchange layer 26 in such manner as to transversely bias the soft film layer 18 via magnetostatic coupling to the MR layer 24.

Figure 3:
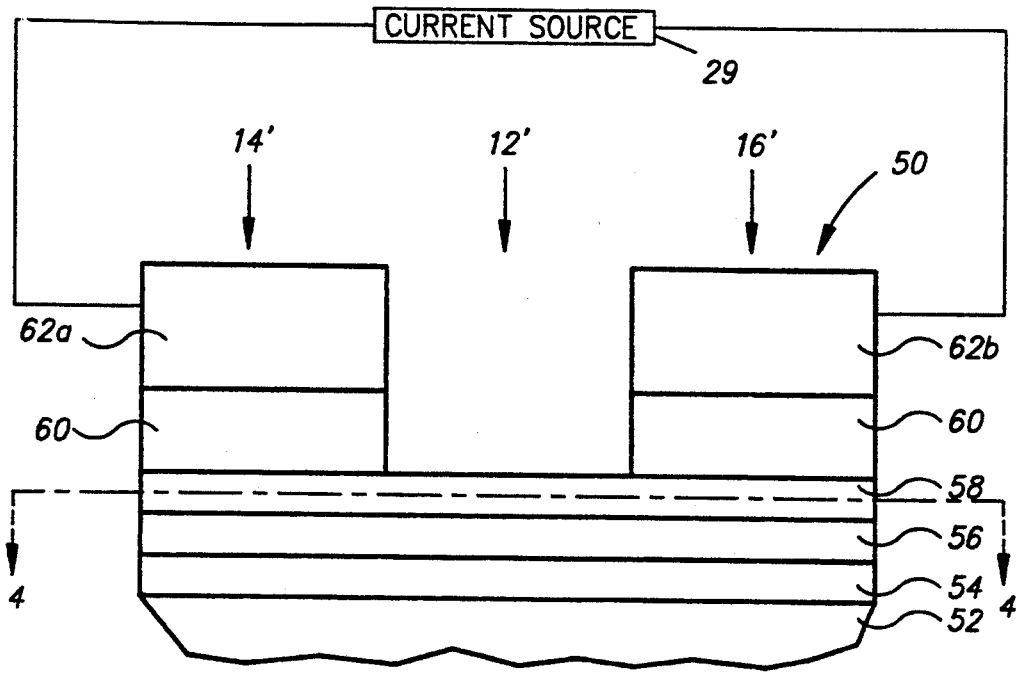
FIG. 3 is an end view of an MR transducer with a continuous spacer layer and to which another embodiment of the invention is applied.

The success achieved by canting the antiferromagnetic exchange layer indicated, and subsequent tests established, that a patterned spacer configuration may no longer be required to ensure stability. FIG. 3 depicts an MR transducer 50 which, according to another embodiment of the invention utilizes a continuous spacer configuration that desirably reduces fabrication complexity and yet maintains magnetic state stability.

Transducer 50 comprises a substrate 52 on which are successively deposited, as continuous films, a soft film magnetic layer 54, a spacer layer 56, and an MR layer 58. An antiferromagnetic layer 60 is patterned to overlay and contact the MR layer 58 only in the end regions 14', 16'. Leads 62a, 62b overlie and contact layer 60 only in the end regions 14', 16', respectively.

Figure 4:
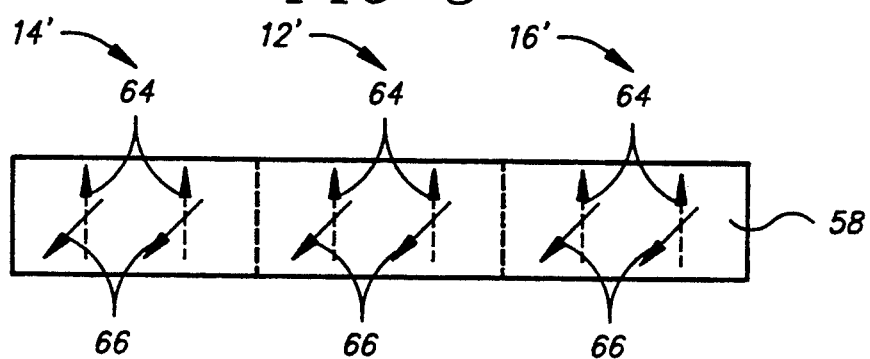
FIG. 4 is a sectional view taken along the line 4—4 of FIG. 3 showing the orientation of the magnetic moments in an MR layer and soft film magnetic layer.
Figure 5:
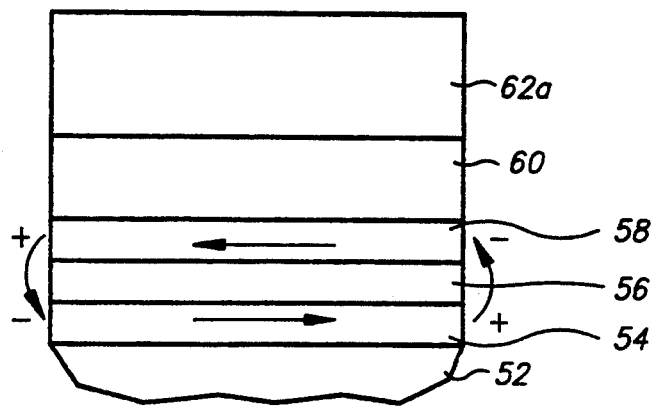
FIG. 5 is an end view taken from the left end of FIG. 3.

As before, the exchange bias is canted by annealing the antiferromagnetic exchange layer 60. Soft film layer 54 in the passive regions 14', 16' is rotated to a direction transversely of the transducer;, i.e., as shown by arrows 64 in FIG. 4, by magnetostatic coupling of the soft film layer to the exchange biased MR layer 58, that has a magnetic moment which is canted, as shown by arrows 66. Soft film layer 54 and MR layer 58 form a flux closure in passive regions 14', 16', (see FIG. 5) analogous to that in active region 12'. The longitudinal magnetic moments of regions 14', 16' are matched with that of region 12'. Since no free magnetic poles exist at track edges, no destabilizing force is generated. It has been found by actual test that, by removal of the uncertainty in the magnetic state in the passive regions 14', 16', the signal amplitude of the MR transducer and asymmetry distribution are improved and a more consistent track definition is achieved.

It should be noted that with either transducer 10 or transducer 50 output asymmetry is minimized after the device has been fabricated by an initial adjustment of the angle of exchange bias canting and that, if necessary, by a subsequent fine tuning adjustment.

While the invention has been shown and described with respect to preferred embodiments thereof, it will be understood by those skilled in the art that changes in form and detail may be made without departing from the scope and teaching of the invention. Accordingly, the MR read transducer and method of fabricating same as herein disclosed are to be considered merely as illustrative and the invention is to be limited only as specified in the claims.

We claim:

1. A magnetoresistive (MR) read transducer having a central active region separating two passive end regions, said transducer comprising:

a soft magnetic layer extending over said central active region and both passive end regions;

an MR layer extending over said central active region and both passive end regions;

a nonmagnetic spacer layer separating said soft magnetic layer and MR layer and extending over said central active region and at least part of both passive end regions; and an antiferromagnetic layer in direct contact with said MR layer only in the end regions and heat treated following deposition of all of said layers to produce an exchange bias field between the antiferromagnetic layer and the MR layer that is oriented at an acute angle to the longitudinal direction of the transducer selected (i) to match magnetic moments of said central active region and said passive end regions during a read operation of the transducer, and (ii) to orient the MR layer at said acute angle, the soft magnetic layer in the passive end regions being transversely oriented through magnetostatic coupling by the magnetic moment of the MR layer.

2. The transducer of claim 1, wherein said acute angle is between about 40 and 45 degrees.

3. The transducer of claim 1, wherein the spacer layer extends the full length of both end regions to constitute a continuous spacer layer.

4. The transducer of claim 1, wherein the spacer layer is a patterned spacer layer that overlies only a part of each end region closely adjacent to the central active region.

5. A method of fabricating an MR transducer having a central active region separating two end regions, comprising the steps of:

providing a soft film magnetic layer and an MR layer that extend over the central region and both end regions and are separated by a nonmagnetic spacer layer extending over the central region and at least part of both end regions;

providing an antiferromagnetic exchange layer in direct contact with the MR layer only in the end regions; and annealing the antiferromagnetic layer in an external field above the Neel temperature to produce between the soft film layer and MR layer an exchange bias field that is oriented at an acute angle to the longitudinal direction of the transducer selected (i) to match magnetic moments of said central region and end regions during an read operation by the transducer, (ii) to orient the MR layer at said acute angle, and (iii) to cause the soft film layer to be oriented in a direction transverse of the transducer through magnetostatic coupling by the magnetic moment of the MR layer.

6. The method of claim 5, wherein the acute angle is about 40 to 45 degrees.

7. The method of claim 5, wherein the antiferromagnetic layer comprises a MnFe/NiFe multilayer structure and the annealing temperature is of the order of about 160 to 180 degrees C.

* * * * *

UNITED STATES PATENT AND TRADEMARK OFFICE
CERTIFICATE OF CORRECTION

PATENT NO. : 5,325,253
DATED : June 28, 1994
INVENTOR(S) : Chen et. al.

It is certified that error appears in the above-indentified patent and that said Letters Patent is hereby corrected as shown below:

On the Title page, item [75]:

Delete "Wang: Po-Kang," , insert -- Po-Kang Wang, --.

Signed and Sealed this

Twenty-first Day of March, 1995

Attest:

BRUCE LEHMAN

*Attesting Officer*   *Commissioner of Patents and Trademarks*